Sept. 27, 1955
E. A. DRILL
2,718,680
HOT TOP STRIPPER
Filed Nov. 29, 1951
2 Sheets-Sheet 1
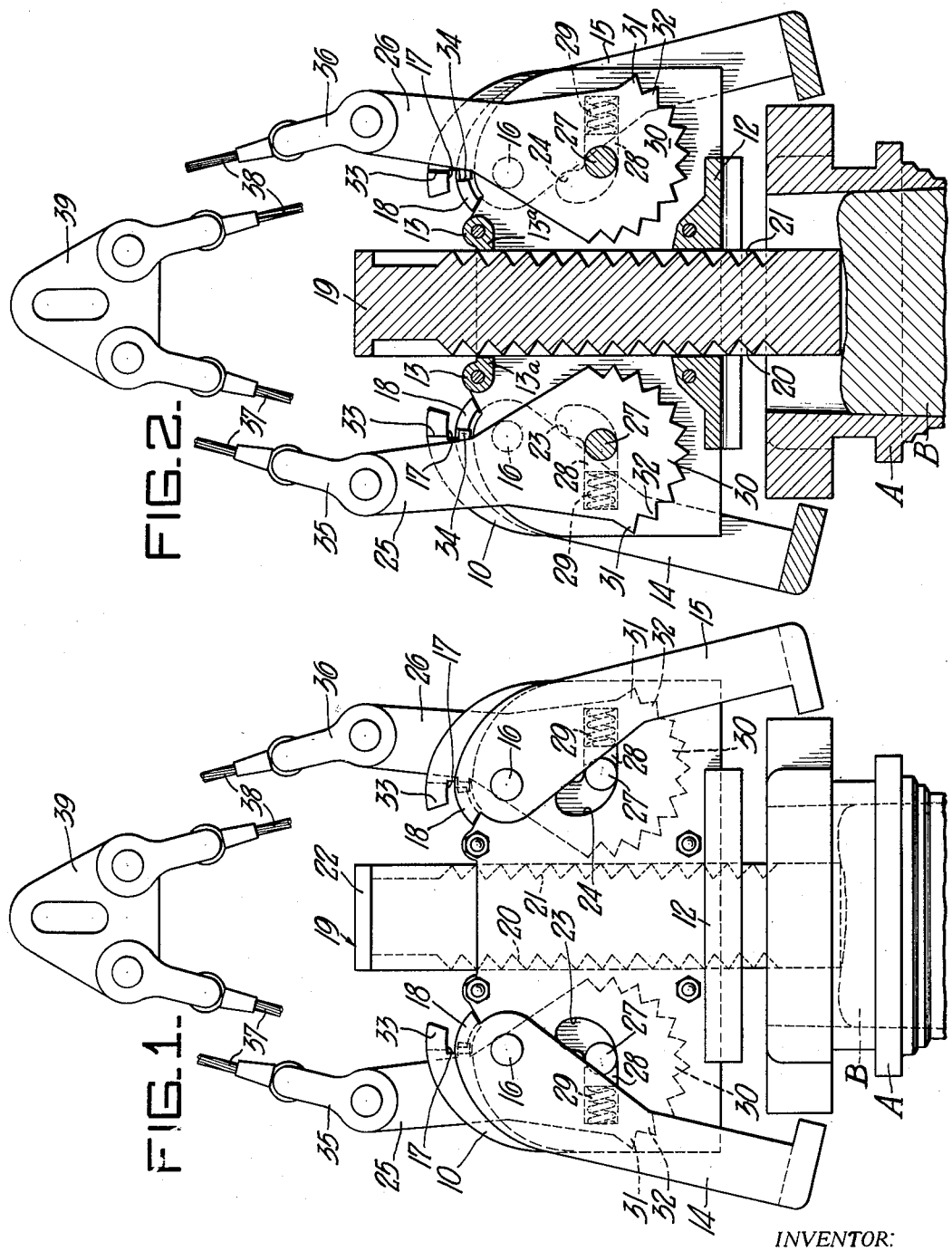
INVENTOR:
ERVIN A. DRILL,
BY:
Donald G. Dalton
his Attorney.

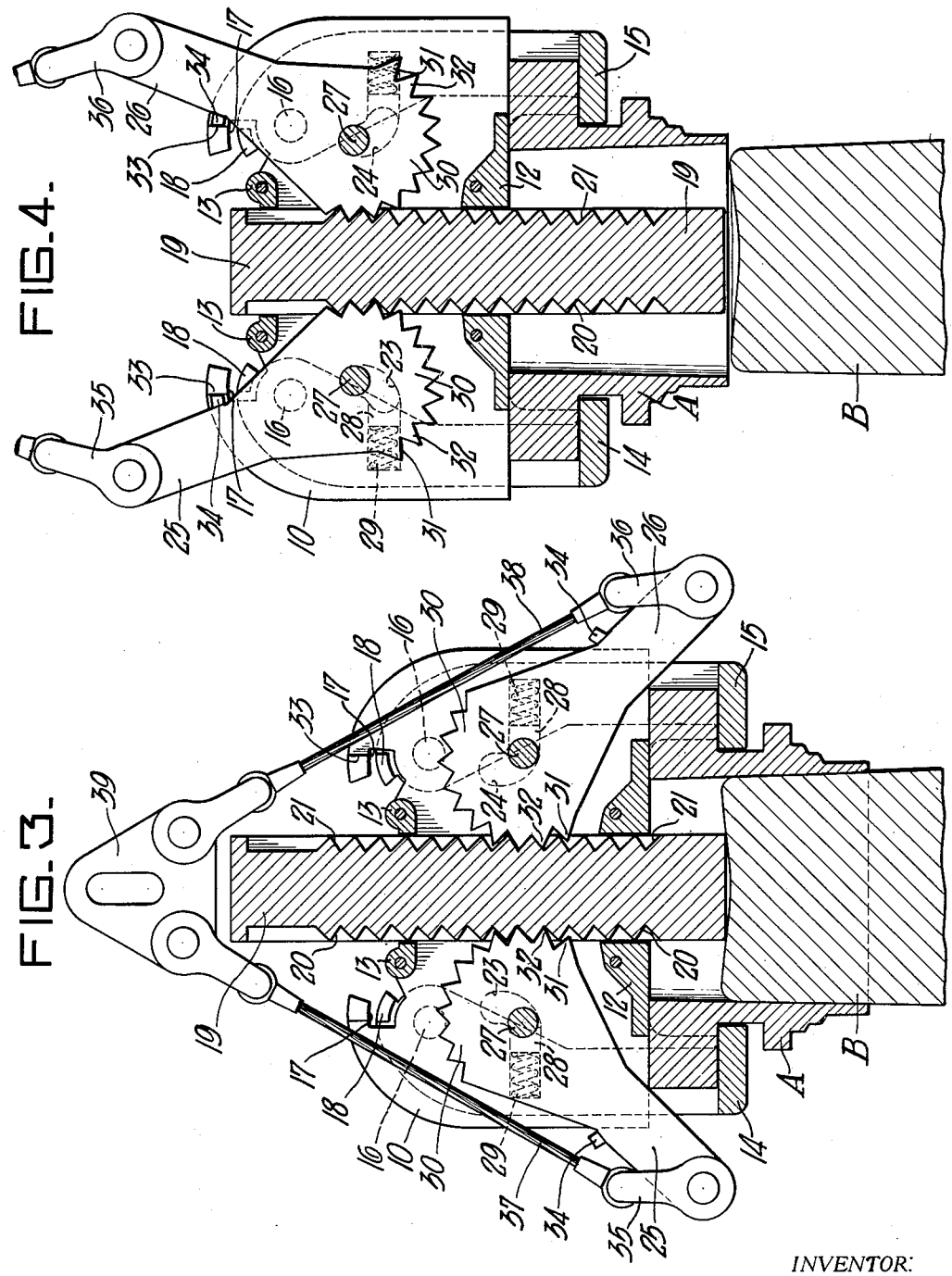

United States Patent Office 2,718,680
Patented Sept. 27, 1955

2,718,680

HOT TOP STRIPPER

Ervin A. Drill, Duluth, Minn.

Application November 29, 1951, Serial No. 258,787

8 Claims. (Cl. 22—95)

This invention relates to an improved hot top stripper, which in the steel making art refers to a crane operated device used for separating hot tops from the sinkhead portions of ingots.

An object of the invention is to provide an improved stripper, which includes a vertically movable ram and pivoted tong arms, and yet is of simplified construction and has fewer parts than usual strippers.

A more specific object is to provide an improved stripper which includes a pair of pivoted tong arms, a vertically movable ram between said tong arms and a pair of pivoted operating arms, and in which the pivot points of the operating arms are shiftable, whereby the operating arms have a position where they can operate the tong arms and another position in which they can operate the ram.

A further object is to provide an improved stripper which operates automatically, that is, the stripper can be lowered vertically over an ingot mold and its pivoted tong arms automatically engage the hot top, next it can be raised and its ram automatically pushes down against the sinkhead to effect a separation, and finally the hot top can be placed on a floor and the stripper automatically releases it and returns to its original position for engaging another hot top.

In accomplishing these and other objects of the invention, I have provided improved details of structure, a preferred form of which is shown in the accompanying drawings, in which:

Figure 1 is a side elevational view of a hot top stripper embodying features of the present invention, the parts being in the position they occupy as the stripper is lowered to engage a hot top;

Figure 2 is a vertical sectional view of the stripper with the parts in the same position as in Figure 1;

Figure 3 is a vertical sectional view with the parts in the position they occupy when the stripper is fully engaged with a hot top and commencing to effect a separation of the hot top from a shinkhead, and Figure 4 is a vertical sectional view with the parts in the position they occupy when the stripper is transporting a hot top.

The stripper of the present invention comprises a housing which is formed of two spaced apart side members 10, a base 12 bolted between said side members at their lower edges, and preferably spacers 13 bolted between said side members at their upper edges. The spacers 13 are short tubular elements whose ends abut the inside faces of the side members 10. Preferably these spacers have opposed inwardly extending projections 13a, as shown in Figure 2. A pair of tong arms 14 and 15 of U-shape in end elevation are pivoted near their upper ends to the outside of the housing on four outwardly projecting studs 16, which are attached to the side members 10. Thus the tong arms ride over the outside of the housing and normally gravitate to a relatively closed position in which their bights extend somewhat below the housing for engaging a hot top A. The extreme upper edges of the tong arms extend inwardly over the interior of the housing through four cut-outs 17 in the upper edges of the side members 10 and form stops 18, the purpose of which is explained hereinafter. A vertically movable ram 19 is carried within the central part of the housing between the tong arms and has gear racks 20 and 21 along its opposite side faces. The projections 13a assist in guiding the ram in its vertical movement. The upper end of the ram has stops 22 which are engageable with the upper edges of the side members 10 to limit downward movement of the ram. The lower end of the ram extends below the housing through a passage in the base 12 and is adapted to exert a downward force against a sinkhead portion B of an ingot, as hereinafter explained.

Each of the two side members 10 contains slots 23 and 24 which are situated on opposite sides of ram 10 and are approximately L-shaped in outline, except that their lower inner edges form smooth curves. A pair of operating arms 25 and 26 are mounted within the housing between the side members 10 and have studs 27 projecting from both sides and riding in slots 23 and 24. Thus the operating arms are pivotally mounted and their pivot points are shiftable as their studs 27 move in slots 23 and 24. Preferably the horizontal leg of each slot contains a follower 28 and a spring 29 urging said follower inwardly toward the ram 19. The lower ends of the operating arms have gear segments 30, the bottom teeth of which are somewhat longer than the other teeth, as indicated at 31, 32. When the pivot points of the operating arms are shifted to the upper ends of slots 23 and 24, the shorter teeth of the gear segments 30 can engage the teeth of gear racks 20 and 21 on ram 19 so that pivotal movement of the operating arms operates the ram, as Figure 4 shows. When the pivot points of the operating arms are shifted to the lower parts of these slots, the upper teeth clear the gear racks, as Figure 2 shows; consequently, unless the operating arms are rotated all the way down to a position where their longer teeth are opposite the gear racks and in engagement therewith, the ram can move freely up and down.

The upper edges of the side members 10 have fixed inwardly projecting stops 33 situated directly above each cut-out 17. The operating arms 25 and 26 have outwardly projecting abutments 34. When the pivot points of the operating arms are shifted to the upper ends of slots 23 and 24, abutments 34 are engageable with stops 33 for limiting upward pivotal movement of the operating arms, as Figure 4 shows. When the pivot points of the operating arms are shifted to the lower parts of these slots, abutments 34 are engageable with the stops 18 on the upper ends of tong arms 14 and 15 for operating the tong arms, as Figure 2 shows.

The upper ends of the operating arms extend beyond the housing and have means for connecting the stripper to an overhead crane. As illustrated, this means includes clevises 35 and 36 pivoted to the arms, ropes 37 and 38 joined to said clevises, and a yoke 39 joined to said ropes and adapted to be carried by a crane hook.

In operation, assume that the crane is lowering the stripper over an ingot to strip the hot top A, the position Figure 1 shows. Studs 27 are in the lower parts of slots 23 and 24. The upper ends of the operating arms are rotated inwardly as far as possible and their abutments 34 engage stops 18 on the tong arms 14 and 15 and thus spread these tong arms. It is seen that the weight of the stripper acts through the operating arms on the clevises 35 and 36 and ropes 37 and 38. The operating arms in effect are fulcrumed about their abutments 34, so that the tendency is for studs 27 to move farther out the slots 23 and 24 against the followers 28 and springs 29. Ram 19 is freely movable vertically and its stop 22 engages the upper edges of side members 10 of the housing.

The bottom of the ram first engages the top of the sinkhead B, and the housing slides down the ram until the bottom of the housing comes to rest on the hot top A. Continued lowering of the crane relaxes the tension in ropes 37 and 38, and thus the weight of the upper ends of the operating arms swings these arms outwardly and finally moves them all the way down to the position Figure 3 shows. The springs 29, acting through the followers 28, push the studs 27 inwardly. The longer teeth 31 and 32 on the operating arms thus move into engagement with the gear racks 20 and 21 on the ram 19. As abutments 34 move away from stops 18, the tong arms gravitate to their relatively closed position and engage the hot top A.

Next the crane again is raised. Studs 27 start moving up the slots 23 and 24 and the upper ends of the operating arms pivot inwardly. The gear segments 30 now engage the gear racks 20 and 21 and force the ram down against the sinkhead B to commence forcing a separation between the hot top and the sinkhead, as Figure 3 shows. As soon as these parts are separated, the operating arms pivot upwardly to the limit permitted by engagement of abutments 34 with stops 33 and the hot top can be transported to any desired location.

When the crane lowers the hot top to place it on a floor, engagement of the bottom of the hot top with the floor and continued lowering of the crane again relaxes the tension in ropes 37 and 38. The upper ends of the operating arms 25 and 26 pivot outwardly and downwardly under their own weight. Studs 27 move down the slots 23 and 24 and return to their lower position, freeing the gear segments 30 from the gear racks 20 and 21. At this time the operating arms are not allowed to move down far enough for their longer teeth 31 and 32 to engage the gear racks 20 and 21, but as soon as the studs move down and free the gear segments 30 from the gear racks, the crane again is raised. The floor now supports the weight of the hot top. As the crane is raised, studs 27 remain in the lower part of the slots, and the operating arms 25 and 26 pivot upwardly until their abutments 34 engage stops 18 on the tong arms 14 and 15. Thus the operating arms spread these tong arms and release the hot top. The ram of course is free to gravitate downwardly until its stops 22 engage the upper edges of the side members 10. The parts now have returned to their original position shown in Figure 1.

From the foregoing description it is seen that the present invention affords a stripper of particularly simple construction. The only major parts are the housing, the ram, the two tong arms, and the two operating arms. The tong arms are pivoted and thus enable the stripper to engage a hot top when it is lowered vertically, as distinguished from fixed tong arms which necessitate moving the stripper sideways into engagement with a hot top.

While I have shown and described only a single embodiment of the invention, it is apparent that modifications may arise. Therefore, I do not wish to be limited to the disclosure set forth but only by the scope of the appended claims.

I claim:

1. A hot top stripper comprising a housing, a pair of tong arms pivoted to the upper portion of said housing and normally gravitating to a relatively closed position in which they are adapted to engage a hot top, stops carried by said tong arms adjacent their upper ends, a vertically movable ram mounted in said housing between said tong arms, a pair of operating arms pivoted intermediate their lengths to said housing on opposite sides of said ram, attachment means carried by said operating arms adjacent one extremity thereof adapted to be connected to an overhead crane, abutments carried by said operating arms and situated between said attachment means and the points at which the operating arms are pivoted to the housing, and ram operating means carried by said operating arms and situated at the extremities thereof opposite said attachment means, the pivot points of said operating arms being shiftable translationally with respect to said housing between a position in which said abutments are engageable with said stops to operate said tong arms and another position in which said ram operating means are engageable with said ram to operate the latter.

2. A hot top stripper comprising a housing, a pair of tong arms pivoted to the upper portion of said housing and normally gravitating to a relatively closed position in which they are adapted to engage a hot top, stops carried by said tong arms adjacent their upper ends, a vertically movable ram mounted in said housing between said tong arms and having gear racks along its opposite side faces, a pair of operating arms pivoted intermediate their lengths to said housing on opposite sides of said ram, attachment means carried by said operating arms adjacent one extremity thereof adapted to be connected to an overhead crane, abutments carried by said operating arms and situated between said attachment means and the points at which the operating arms are pivoted to the housing, and gear segments carried by said operating arms and situated at the extremities thereof opposite said attachment means, the pivot points of said operating arms being shiftable translationally with respect to said housing between a position in which said abutments are engageable with said stops to operate said tong arms and another position in which said gear segments are engageable with said gear racks to operate said ram.

3. A hot top stripper comprising a housing, a pair of tong arms pivoted to the upper portion of said housing and normally gravitating to a relatively closed position in which they are adapted to engage a hot top, stops carried by said tong arms adjacent their upper ends, a vertically movable ram mounted in said housing between said tong arms and having gear racks along its opposite side faces, a pair of operating arms pivoted intermediate their lengths to said housing on opposite sides of said ram, attachment means carried by said operating arms adjacent one extremity thereof adapted to be connected to an overhead crane, abutments carried by said operating arms and situated between said attachment means and the points at which the operating arms are pivoted to the housing, and gear segments carried by said operating arms and situated at the extremities thereof opposite said attachment means, said gear segments having teeth adjacent one end of greater length than their other teeth, the pivot points of said operating arms being shiftable translationally with respect to said housing between a position in which said abutments are engageable with said stops to operate said tong arms and only the longer teeth of said gear segments are engageable with said gear racks, and another position in which the other teeth of said gear segments are engageable with said gear racks.

4. A hot top stripper comprising a housing having side members which contain spaced apart L-shaped slots, a pair of tong arms pivoted to the upper portion of said housing and depending therebelow and normally gravitating to a relatively closed position in which they are adapted to engage a hot top, a vertically movable ram mounted in said housing between said tong arms, a pair of operating arms having projecting pivot studs situated intermediate their lengths riding in said slots, attachment means carried by said operating arms adjacent one extremity thereof adapted to be connected to an overhead crane, tong operating means carried by said operating arms and situated between said attachment means and said studs, and ram operating means carried by said operating arms and situated at the extremities thereof opposite said attachment means, said studs having a position in said slots in which said tong operating means are engageable with said tong arms and another position in which said ram operating means are engageable with said ram.

5. A hot top stripper comprising a housing having side members which contain spaced apart L-shaped slots, a pair of tong arms pivoted to the upper portion of said housing and depending therebelow and normally gravitating to a relatively closed position in which they are adapted to engage a hot top, stops carried by said tong arms adjacent their upper ends, a vertically movable ram mounted in said housing between said tong arms and having gear racks along its opposite side faces, a pair of operating arms having projecting pivot studs situated intermediate their lengths riding in said slots, attachment means carried by said operating arms adjacent one extremity thereof adapted to be connected to an overhead crane, abutments carried by said operating arms and situated between said attachment means and said studs, and gear segments carried by said operating arms and situated at the extremities thereof opposite said attachment means, said studs having a position in said slots in which said abutments are engageable with said stops for operating said tong arms and another higher position therein in which said gear segments are engageable with said gear racks for operating said ram.

6. A hot top stripper comprising a housing having side members which contain spaced apart L-shaped slots, a pair of tong arms pivoted to the upper portion of said housing and depending therebelow and normally gravitating to a relatively closed position in which they are adapted to engage a hot top, stops carried by said tong arms adjacent their upper ends, a vertically movable ram mounted in said housing between said tong arms and having gear racks along its opposite side faces, a pair of operating arms having projecting pivot studs riding in said slots, attachment means carried by said operating arms adjacent one extremity thereof adapted to be connected to an overhead crane, abutments carried by said operating arms and situated between said attachment means and said studs, and gear segments carried by said operating arms and situated at the extremities thereof opposite said attachment means, said gear segments having teeth adjacent one end of greater length than their other teeth, said studs having a position in said slots in which said abutments are engageable with said stops for operating said tong arms and only the longer teeth of said gear segments are engageable with said gear racks, and another higher position in which the other teeth of said gear segments are engageable with said gear racks.

7. A stripper as defined in claim 6 including spring pressed followers mounted in said slots outwardly of said studs and adapted to engage the latter.

8. In a hot top stripper, a housing, a pair of tong arms pivoted to said housing, a ram mounted for vertical movement in said housing, a pair of operating arms, and means mounting said operating arms in said housing for both pivotal and translational shifting movement with respect thereto, said operating arms including means for operating said tong arms and means for operating said ram.

References Cited in the file of this patent

UNITED STATES PATENTS

| | | |
|---|---|---|
| 2,317,565 | Urmetz | Apr. 27, 1943 |
| 2,345,391 | Grossett | Mar. 28, 1944 |
| 2,439,705 | Urmetz | Apr. 13, 1948 |

FOREIGN PATENTS

| | | |
|---|---|---|
| 594,619 | France | June 27, 1925 |
| 634,492 | Germany | Aug. 28, 1936 |
| 727,889 | Germany | Nov. 14, 1942 |